United States Patent
Waflart, Jr.

[15] 3,656,203
[45] Apr. 18, 1972

[54] CASTER AND CASTER BRAKE STRUCTURE FOR APPLIANCES AND THE LIKE

[72] Inventor: Theodore A. Waflart, Jr., Louisville, Ky.
[73] Assignee: General Electric Company
[22] Filed: Sept. 5, 1969
[21] Appl. No.: 855,624

[52] U.S. Cl. ................................................16/35
[51] Int. Cl. ..........................................B60b 33/00
[58] Field of Search ..................16/35, 35 D, 19; 188/1 D

[56] References Cited

UNITED STATES PATENTS

| | | | |
|---|---|---|---|
| 2,812,041 | 11/1957 | Mugler | 16/35 |
| 2,853,732 | 9/1958 | Matter | 16/19 |
| 3,239,873 | 3/1966 | Fisher | 16/35 |

FOREIGN PATENTS OR APPLICATIONS 700,821  1/1931  France..........................16/35

Primary Examiner—James T. McCall
Assistant Examiner—Doris L. Troutman
Attorney—Walter E. Rule, Harry F. Manbeck, Jr., Frank L. Neuhauser, Oscar B. Waddell and Joseph B. Forman

[57] ABSTRACT

An appliance supporting caster structure includes a caster assembly adjustably mounted on a frame portion of the appliance. The caster assembly includes a U-shaped body member having a caster wheel rotatably mounted thereon. A brake means for the caster wheel comprises a chock and operating means for mounting the chock on the appliance frame for movement between a position in which the chock blocks rolling movement of the wheel and an inoperative position. The operating means also includes a portion frictionally engaging the caster assembly body member for holding the chock in either of these positions.

2 Claims, 4 Drawing Figures

PATENTED APR 18 1972  3,656,203
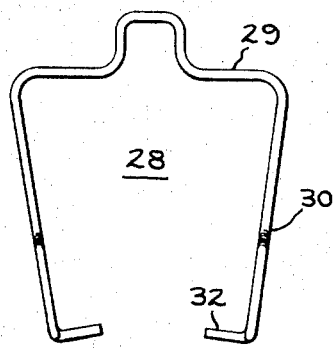
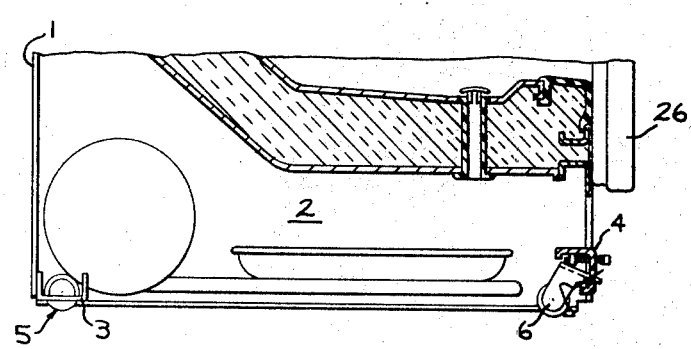
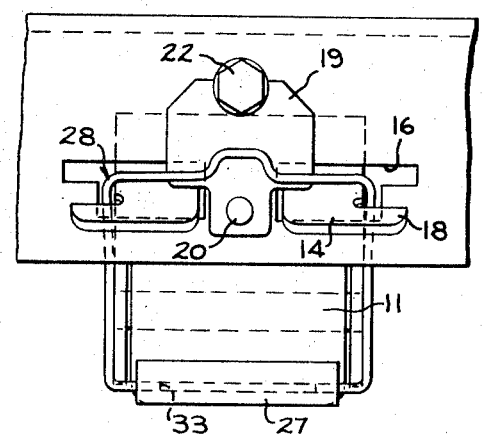
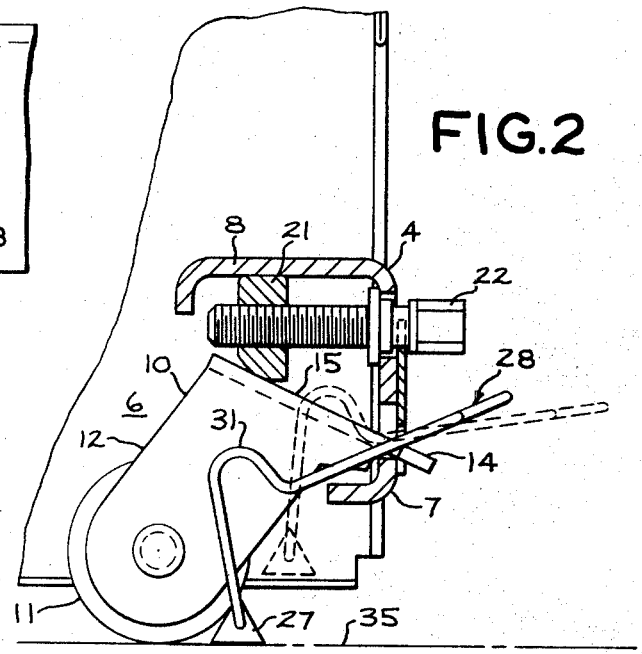
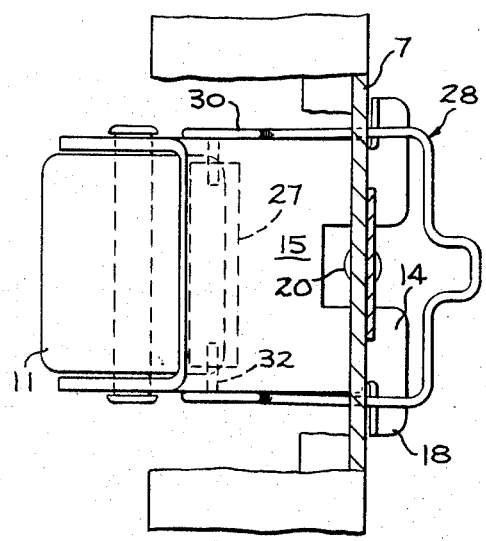
INVENTOR.
THEODORE A. WAFLART JR.
BY Walter E. Rule
HIS ATTORNEY

CASTER AND CASTER BRAKE STRUCTURE FOR APPLIANCES AND THE LIKE

BACKGROUND OF THE INVENTION

A number of modern kitchen appliances and particularly household refrigerators are supported on rollers or caster wheels to facilitate the movement of the appliance over a supporting surface. It is desirable that at least some of these rollers or casters be vertically adjustable for levelling the appliance. It is also desirable that the user of the appliance be able to prevent movement of the appliance during normal use thereof.

It is a primary object of the present invention to provide a simple and low cost caster assembly adjustably mounted on an appliance frame member and including brake means for blocking the caster assembly during normal use of the appliance.

SUMMARY OF THE INVENTION

In accordance with the illustrated embodiment of the invention, there is provided, in combination with an appliance having a rigid supporting or frame structure, a caster assembly and brake means whereby the appliance can be easily moved over a supporting surface but can be blocked from movement during normal use thereof. The caster assembly comprises a generally U-shaped body portion having an arm extending from the bight section of the body portion for pivotally mounting the caster assembly on the frame structure and a screw driven wedge operatively positioned between the bight section and an adjacent portion of the frame structure for effecting vertical adjustment of the caster assembly. A brake means for the caster roller or wheel comprises a chock and operating means mounting the chock on the frame structure for movement between an operative position in which the chock is in blocking engagement with the wheel adjacent the supporting surface and an inoperative position. The operating means is so designed that a portion thereof frictionally engages the leg portions of the caster assembly body portion for holding the chock in either of its two positions.

BRIEF DESCRIPTION OF THE DRAWING

In the accompanying drawing:

FIG. 1 is a side elevational view, partly in section, of the lower frame portion of a refrigerator cabinet incorporating the present invention;

FIG. 2 is an enlarged section view illustrating the caster and brake assembly of the present invention;

FIG. 3 is a front view of the assembly illustrated in FIG. 2;

FIG. 4 is a top or plan view of the assembly with a portion of the cabinet frame structure broken away; and FIG. 5 is a view of the operating means forming part of the brake component of the present invention.

DESCRIPTION OF THE PREFERRED EMBODIMENT

Referring to FIG. 1 of the drawing, there is shown for the purpose of illustrating the present invention a refrigerator cabinet 1 having a horizontal frame structure below the machinery compartment 2. This frame structure includes a transversely extending rear frame member 3 and a transversely extending front frame member 4. For the purpose of providing the desired mobility to the refrigerator, casters or rollers are provided at the four corners of the bottom frame. In the illustrated embodiment of the invention the casters 5 at the rear corners are non-adjustable while the front end of the cabinet is supported by adjustable caster assemblies, generally indicated by the numeral 6, at each front corner of the frame.

As is shown more particularly in FIG. 2 of the drawing, the front frame member or structure 4 is of a generally inverted L-shape cross-section so that it comprises a vertically extending flange 7 and a horizontally extending flange 8, the horizontal flange projecting rearwardly from the flange 7. The caster assembly 6 is adapted to be mounted rearwardly from the flange 7 and beneath the flange 8. It comprises a downwardly opening U-shaped body portion 10 with a caster wheel or roller 11 rotatably mounted between the downwardly extending legs 12 of the caster body 10. An arm or extension 14 extending forward from the upper or bight portion 15 of the caster body and bifurcated at its forward end provides means for pivotally supporting the castor assembly on the flange 7. More specifically this arm 14 extends, as shown in FIGS. 2, 3, and 4 of the drawing, through a relatively wide T-shaped slot 16 in the flange 7. It is inserted through the upper horizontally-extending portion of the T-shaped slot 16 and is retained in the vertical portion thereof by engagement of laterally extending ears 18 on the arm 14 with the adjacent front surfaces of the frame member 7. A retainer 19 secured by means of a rivet 20 to the flange 7 engages the upper surface of the arm 14 to hold that arm in the lower portion of the T-shaped slot.

As will be best seen from FIG. 2 of the drawing, the caster assembly 6 is free to pivot within a limited range about the horizontal axis defined by the point at which the arm 14 passes through the flange 7. For vertically adjusting the caster assembly or more specifically the roller or wheel 11 relative to the frame member 4, there is provided a wedge 21 positioned between the lower surface of the horizontal flange 8 and the bight 15 and an adjusting screw 22 rotatably mounted in the flange 7 and threadably engaging the wedge 21. With the bight 15 being in angular or slanting relationship with the flange 8, forward or rearward movement of the wedge 21 by the adjusting screw 22 provides for a limited vertical adjustment of the caster assembly to level the refrigerator when in its normal position.

The front and rear casters or rollers 5 and 6 facilitate movement of the refrigerator cabinet as for example from its normal position adjacent a kitchen wall to a forward position for cleaning beneath or behind the refrigerator. However during normal use of the refrigerator, it is desirable that it remain stationary. For the purpose of preventing undesired movement of the refrigerator from its normal position, as for example during opening of one or more of a door 26 at the front of the cabinet, there is provided a simple and low cost braking means adapted to block forward rolling movement of the caster wheel 11. This braking means comprises a rubber wheel chock 27 of a triangular cross section which is pivotally and slidably mounted on the flange 7 by operating means in the form of a wire clip 28 extending through the T-shaped slot 16. This wire clip of a generally U-shaped configuration includes a forward or bight portion 29 on the front side of the flange 7 and legs 30 extending through the opposite ends of the T-shape slot 16, these legs 30 being bent downwardly from knee portions 31 for insertion of inwardly extending end portions 32 thereof into holes 33 provided in the opposite ends of the chock 27. By grasping the forward or bight portion 29 of the operating means 28, the user can move the wedge 27 from its solid line position shown in FIG. 2 in which the wedge is in blocking engagement with both the roller 11 and the supporting surface 35 on which the cabinet is supported to its dotted line position as shown in FIG. 2 where the wedge 27 is inoperative to block rolling movement of the roller 11.

For the purpose of holding the blocking wedge 27 in either the operative or an inoperative position, the U-shaped clip has a preassembled shape such that the legs 30 slant inwardly towards one another from the bight or handle portion 29 of the clip as illustrated in FIG. 5. This shape assures that at least the knee portions 31 of the clip will frictionally engage the outer surfaces of the caster body legs 12 in all positions of the caster assembly and of the wedge 27.

From the above description, it will be seen that when the refrigerator has been placed in its desired normal position, all the user need do to block the refrigerator in that position is to push upwardly on the forwardly extending portion of the clip 28 for pivotal movement thereof about the point at which it extends through the T-shape slot 16 so that the wedge 27 is brought downwardly into engagement with the floor or supporting surface 35 whereupon the braking assembly is pushed rearwardly to bring the chock into engagement with the roller 11. It will be retained in this position by frictional engagement of the legs 30 with the outer surfaces of the caster legs 12. In order to release the chock 27 from its blocking position, the user pulls forwardly on the bight portion 29 of the clip 28 to disengage the chock 27 from the roller and preferably also from the supporting surface. The refrigerator can then be freely rolled over the supporting surface.

It should be apparent to those skilled in the art that while there has been described what, at present, is considered to be the preferred embodiment of this invention in accordance with the Patent Statutes, changes may be made in the disclosed apparatus without actually departing from the true spirit and scope of this invention.

I claim:

1. In combination:
   a frame structure;
   a caster assembly mounted on said frame structure and including spaced depending portions having a caster wheel rotatably mounted therebetween for supporting said frame structure for rolling movement on a supporting surface;
   a brake means for said wheel comprising a chock;
   operating means mounting said chock on said frame structure for movement between an operative position in which said chock is in blocking engagement with said supporting surface and an adjacent surface of said wheel and an inoperative position in which said chock is disengaged from at least one of said surfaces;
   said operating means comprising a generally U-shaped wire member including flexible legs extending through said frame structure on opposite sides of said caster assembly and formed to include knee portions which frictionally engage said depending portions for holding said chock in either of said positions.

2. The combination of claim 1 in which said caster assembly is vertically adjustable relative to said frame structure.

* * * * *